United States Patent [19]

Matsumura et al.

[11] Patent Number: 5,691,412
[45] Date of Patent: Nov. 25, 1997

[54] POLYAMIDE/ALIPHATIC POLYESTER BLOCK COPOLYMER, PROCESS FOR THE PRODUCTION THEREOF, AND BLEND CONTAINING THE SAME

[75] Inventors: Shunichi Matsumura; Takashi Ito; Takanori Miyoshi, all of Iwakuni, Japan

[73] Assignee: Teijin Limited, Osaka, Japan

[21] Appl. No.: 449,939

[22] Filed: May 25, 1995

Related U.S. Application Data

[62] Division of Ser. No. 200,454, Feb. 23, 1994, Pat. No. 5,446,109.

[30] Foreign Application Priority Data

| Feb. 23, 1993 | [JP] | Japan | 5-33189 |
| Apr. 20, 1993 | [JP] | Japan | 5-93028 |
| Jul. 14, 1993 | [JP] | Japan | 5-174279 |
| Aug. 26, 1993 | [JP] | Japan | 5-211368 |
| Nov. 1, 1993 | [JP] | Japan | 5-273482 |

[51] Int. Cl.$^6$ .................................................. C08L 77/00
[52] U.S. Cl. ......................... 525/66; 525/92 A; 525/394; 525/397; 525/420; 525/425; 525/432
[58] Field of Search .................. 525/425, 420, 525/66, 92 A, 394, 397, 432

[56] References Cited

U.S. PATENT DOCUMENTS

| 3,554,983 | 1/1971 | Goodman et al. . | |
| 3,758,631 | 9/1973 | Werner et al. . | |
| 4,588,785 | 5/1986 | Bax et al. | 525/419 |
| 5,093,437 | 3/1992 | Komiya et al. | 525/440 |

FOREIGN PATENT DOCUMENTS

| 2233853 | 6/1973 | France . |
| 54-119594 | 9/1979 | Japan . |
| 1140463 | 1/1969 | United Kingdom . |

*Primary Examiner*—Ana Woodward
*Attorney, Agent, or Firm*—Sherman and Shalloway

[57] ABSTRACT

A polyamide/aliphatic polyester block copolymer (A) comprising a polyamide block and an aliphatic polyester block, (B) satisfying the expression, $T_1-T<100-C$ (in which T is the melting point (°C.) of the above block copolymer, $T_1$ is the melting point (°C.) of a polyamide composed of the polyamide block and C is the content (wt. %) of the polyamide block), (C) exhibiting the extraction amount which satisfies the expression, when extracted in tetrahydrofuran, $E<(100-C)\times0.4$ (in which E is the extraction amount (wt. %) when the block copolymer is refluxed in tetrahydrofuran, and C is the content (wt. %) of the polyamide block) and (D) having an intrinsic viscosity, measured at 35° C., in the range of from 0.5 to 5; a process for the production thereof; a fiber formed therefrom; and an intimate blend comprising a thermoplastic resin having no or poor compatibility with polyamide and the block copolymer.

25 Claims, 2 Drawing Sheets

POLYAMIDE/ALIPHATIC POLYESTER BLOCK COPOLYMER, PROCESS FOR THE PRODUCTION THEREOF, AND BLEND CONTAINING THE SAME

This is a division of application Ser. No. 08/200,454 filed Feb. 23, 1994, which issued as U.S. Pat. No. 5,446,109 on Aug. 29, 1995.

BACKGROUND OF THE INVENTION

The present invention relates to a polyamide/aliphatic polyester block copolymer, a process for the production thereof and a blend containing the same. More specifically, it relates to a polyamide/aliphatic polyester block copolymer which exhibits excellent thermal stability and good melt-fluidity, a process for the production thereof and a blend containing the same.

Japanese Patent Publication No. 19265/1967 discloses a method in which a polyamide having terminal amino groups is melt-reacted under heat with a six- or seven-membered lactone such as δ-valerolactone or ε-caprolactone. The block copolymer obtained by this method has a softening point which shows that the degree of randomness is considerably high.

Japanese Patent Publication No. 29468/1969 discloses a method in which caprolactam and caprolactone are allowed to react in the presence of metal sodium to produce a polyester-polyamide copolymer. The polyester-polyamide copolymer obtained by this method shows the linearity in the relationship between the polymer composition and melting point as is described in the said Publication. Therefore, it is different from a typical random copolymer which shows a downward convex form in the above relationship, but it is a block copolymer whose randomness degree is considerably high.

Similarly to Japanese Patent Publication No. 29468/1969, Eur. Polym. J. Vol. 20, No. 6, pages 529–537 (1984) discloses a method in which ε-caprolactone and ε-caprolactam are polymerized in a ring-opening polymerization to produce a copolymer of polycaprolactone and polycaprolactam.

Japanese Patent Publication No. 26688/1982 discloses a method for producing a biodegradable polyester amide copolymer, in which a mixture of a polycaprolactone having a high molecular weight and an aliphatic polyamide having a high molecular weight is melted by heating it to a temperature equal to, or higher than, the melting points of these and the ester/amide exchange reaction is carried out until a product which shows a clear drop in melting point is obtained. The melting point of the copolymer disclosed in the said Publication shows that the said copolymer has a considerably high degree of randomness.

Japanese Laid-open Patent Publication No. 171731/1986 discloses a polycaprolactoneamide elastomer which contains 20 to 90% by weight of a polyamide component and 80 to 10% by weight of a polycaprolactone component and is excellent in impact absorption.

Japanese Laid-open Patent Publication No. 306229/1992 discloses a biodegradable polyesteramide copolymer which contains an aliphatic polyester block and an aromatic polyamide block and has a melting point lower than that of the aromatic polyamide used as a raw material. As a method for producing this biodegradable polyesteramide copolymer, the said Publication discloses a method in which a mixture of a polyester and a polyamide is allowed to react by heating it to a temperature equal to, or higher than, the melting or softening points of these in an inert gas until the formation of a product which shows a clear drop in melting point from the melting or softening points of these.

In the method of reacting polyester and polyamide in an ester/amide exchange reaction while they are melted, it is required to react them at a high temperature for a long period of time, and the productivity is hence very low, since polyamide and polyester are inherently incompatible with each other. Further, this method is also very disadvantageous in terms of energy since a copolymer is formed by sectioning the chain of a polymer once produced as one having a high polymerization degree.

Japanese Laid-open Patent Publication No. 156010/1993 discloses a method for producing a biodegradable polylactoneamide resin containing 5 to 70% by weight of polyamide units and 30 to 95% by weight of polylactone units, in which a polyamide-forming compound and a polylactone compound having an average molecular weight of at least 10,000 are allowed to react.

It is an object of the present invention to provide a novel polyamide/aliphatic polyester block copolymer.

It is another object of the present invention to provide a polyamide/aliphatic polyester block copolymer whose randomness degree is highly inhibited and which therefore exhibits a remarkably high melting point over that of a random copolymer.

It is further another object of the present invention to provide a polyamide/aliphatic polyester block copolymer which has a high degree of block segment formation and whose polyamide and aliphatic polyester contents are inhibited to remarkably low degrees.

It is still further another object of the present invention to provide a process for producing the above polyamide/aliphatic polyester block copolymer of the present invention industrially advantageously.

It is yet another object of the present invention to provide a polyamide/aliphatic polyester block copolymer having the shape memory and restoration capability.

It is yet another object of the present invention to provide a resin blend containing the above polyamide/aliphatic polyester block copolymer of the present invention, e.g., a resin blend containing the above polyamide/aliphatic polyester block copolymer of the present invention as a compatibilizing agent for intimately mixing resins which are poor in compatibility to each other.

Other objects and advantages of the present invention will be apparent from the following description.

The above objects and advantages of the present invention are achieved, first, by a polyamide/aliphatic polyester block copolymer;

(A) comprising a polyamide block composed substantially of at least one of a recurring unit of the formula (1),

wherein $R_1$ is an alkylene group having 4 to 12 carbon atoms, and a recurring unit of the formula (2),

wherein $R_2$ is an alkylene group having 4 to 12 carbon atoms or an alkylene-arylene-alkylene group having 8 to 16 carbon atoms, and $R_3$ is an alkylene group having 4 to 12 carbon atoms or an arylene group having 6 to 12 carbon atoms, and an aliphatic polyester block composed substantially of at least one of a recurring unit of the formula (3),

(3)

wherein $R_4$ is an alkylene group having 1 to 12 carbon atoms, and a recurring unit of the formula (4),

(4)

wherein $R_5$ is an alkylene group having 2 to 12 carbon atoms and $R_6$ is an alkylene group having 2 to 12 carbon atoms or a combination of an alkylene group having 2 to 12 carbon atoms and a divalent aromatic group, (B) satisfying the following expression (5), $T_1-T<100-C$ ... (5) wherein T is the melting point (°C.) of the above block copolymer, $T_1$ is the melting point (°C.) of a polyamide composed of the polyamide block and C is the content (wt. %) of the polyamide block, (C) exhibiting the extraction amount which satisfies the expression (6), when extracted in tetrahydrofuran, $E<(100-C)\times0.4$ ... (6) wherein E is the extraction amount (wt. %) when the block copolymer is refluxed in tetrahydrofuran of which the weight is 100 times the weight of the block copolymer under heat for 2 hours, and C is the content (wt. %) of the polyamide block, and (D) having an intrinsic viscosity, measured at 35° C., in the range of from 0.5 to 5.

Figure 1:
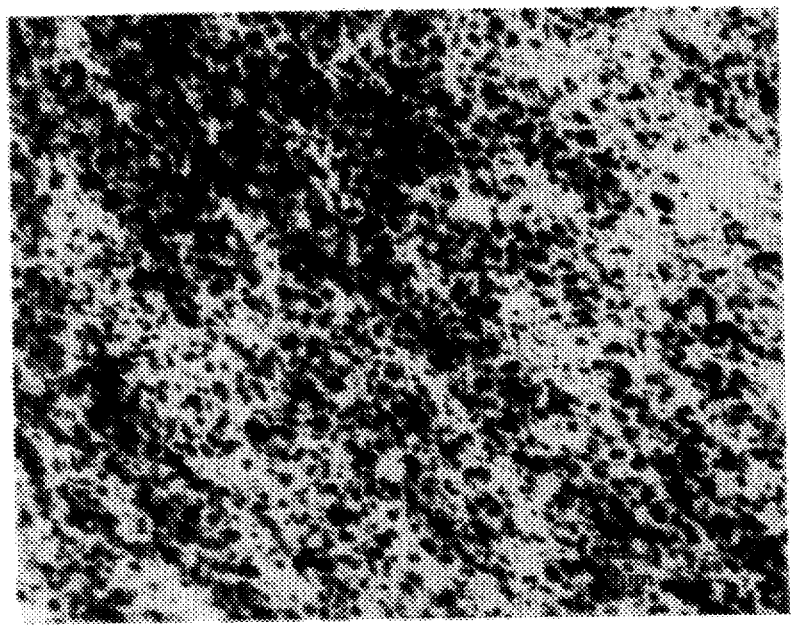
FIG. 1 is the scanning electron microscopic photograph of a block copolymer (Example 1) of the present invention.

The polyamide/aliphatic polyester block copolymer of the present invention is defined by the above requirements (A), (B), (C) and (D).

The requirement (A) defines that the above block copolymer of the present invention comprises a polyamide block composed essentially of at least one of the recurring unit of the formula (1) and the recurring unit of the formula (2) and an aliphatic polyester block composed substantially of at least one of the recurring unit of the formula (3) and the recurring unit of the formula (4).

In the formula (1), $R_1$ is an alkylene group having 4 to 12 carbon atoms. This alkylene group may be linear or branched, while a linear alkylene group is preferred. Examples of this alkylene group include tetramethylene, pentamethylene, hexamethylene, decamethylene, undecamethylene and dodecamethylene. Of these, pentamethylene is preferred. When $R_1$ is pentamethylene, the above formula (1) is represented by the following formula (1)-a.

(1)-a

Examples of the recurring unit of the above formula (1) further include

In the formula (2), $R_2$ is an alkylene group having 4 to 12 carbon atoms or an alkylene-arylene-alkylene group having 8 to 16 carbon atoms, and $R_3$ is an alkylene group having 4 to 12 carbon atoms or an arylene group having 6 to 12 carbon atoms.

The alkylene group having 4 to 12 as each of $R_2$ and $R_3$ may be linear, branched or cyclic.

Examples of each alkylene group above include tetramethylene, hexamethylene, octamethylene, decamethylene, dodecamethylene, neopentylene, 2,2,4-trimethylhexamethylene, 2,4,4-trimethylhexamethylene and 1,4-cyclohexylene.

Examples of the alkylene-arylene-alkylene group having 8 to 16 carbon atoms as $R_2$ include p-xylylene, m-xylylene,

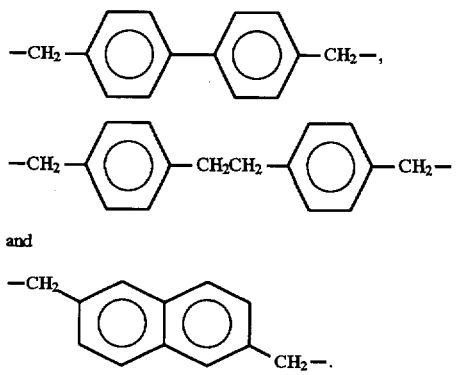

Further, examples of the arylene group having 6 to 12 carbon atoms as $R_3$ include m-phenylene, p-phenylene, 2,6-naphthylene and 1,4-biphenylene.

Of these, hexamethylene is preferred as $R_2$, and tetramethylene is preferred as $R_3$. In this case, the above formula (2) is represented by the following formula (2)-a.

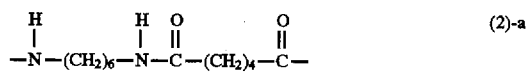
(2)-a

Examples of the recurring unit of the above formula (2) further include

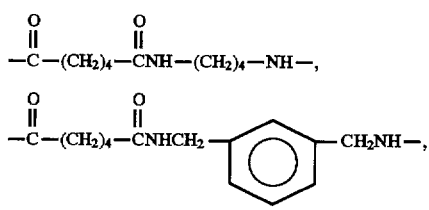

-continued

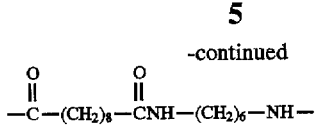

and

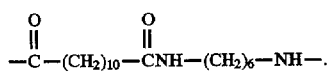

In the present invention, the polyamide block is composed substantially of the recurring unit of the above formula (1) or is composed substantially of the recurring unit of the above formula (2) or is composed of the recurring unit of the above formula (1) and the recurring unit of the above formula (2).

In the aliphatic polyester block, $R_4$ in the formula (3) is an alkylene group having 1 to 12 carbon atoms. This alkylene group may be linear or branched, while a linear alkylene group is preferred.

Examples of the above alkylene group include methylene, methylmethylene, tetramethylene, ethylene, trimethylene, tetramethylene, pentamethylene, hexamethylene, decamethylene and undecamethylene. Of these, methylene, methylmethylene and pentamethylene are preferred. Pentamethylene is particularly preferred. In this case, the above formula (3) represents a caprolactone block of the following formula (3)-a.

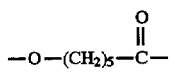  (3)-a

In the formula (4), $R_5$ is an alkylene group having 2 to 12 carbon atoms.

This alkylene group may be linear, branched or cyclic.

Examples of the above alkylene group include ethylene, trimethylene, tetramethylene, hexamethylene, octamethylene, decamethylene, dodecamethylene, neopentylene, 3-methylpentamethylene, 2,2,4-trimethylhexamethylene, 2,4,4-trimethylhexamethylene and 1,4-cyclohexylene.

In the formula (4), further, $R_6$ is an alkylene group having 2 to 12 carbon atoms or a combination of an alkylene group having 2 to 12 carbon atoms with a divalent aromatic group.

Examples of each of the above alkylene groups having 2 to 12 carbon atoms include those described concerning $R_5$ above.

In the combination of an alkylene group having 2 to 12 carbon atoms with a divalent aromatic group, the divalent aromatic group is preferably a subordinate component, and the content of the component unit from the divalent aromatic group on the basis of the total of the recurring units is preferably 30 mol % or less, more preferably 20 mol % or less, particularly preferably 10 mol % or less. Examples of the divalent aromatic group include

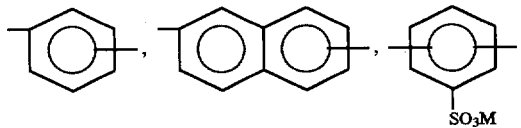

in which M is an alkali metal atom, a quaternary ammonium group or a quaternary phosphonium group.

The block copolymer of the present invention, containing a small amount of the component from

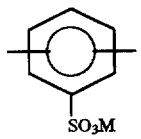

shows a low surface resistivity, has permanent antistatic properties and hence can be used as a permanent antistatic agent for other thermoplastic resins.

In the present invention, the aliphatic polyester block is composed substantially of the recurring unit of the above formula (3) or is composed substantially of the recurring unit of the above formula (4) or is composed substantially of the recurring unit of the above formula (3) and the recurring unit of the above formula (4).

In the block copolymer of the present invention, the content of the polyamide block is 5 to 90% by weight, and the content of the aliphatic polyester block is 95 to 10% by weight. Preferably, the content of the polyamide block is 7 to 85% by weight, and the content of the aliphatic polyester block is 93 to 15% by weight. Particularly preferably, the content of the polyamide block is 10 to 80% by weight, and the content of the aliphatic polyester block is 90 to 20% by weight.

The requirement (B) defining the block copolymer of the present invention shows that the randomness degree of the block copolymer of the present invention is highly inhibited.

That is, the requirement (B) defines that the block copolymer of the present invention satisfies the following expression (5).

$$T_1-T<100-C \qquad (5)$$

wherein T is the melting point (°C.) of the block copolymer, $T_1$ is the melting point of a polyamide composed of the polyamide block and C is the content (wt. %) of the polyamide block.

$T_1$ is a melting point of a polyamide comprising the polyamide block composed of at least one of a recurring unit of the formula (1) and a recurring unit of the formula (2).

Under the conditions satisfying the formula (5), preferably, the block copolymer of the present invention satisfies the following expression (5)-a.

$$T_1-T<0.8(100-C) \qquad (5)\text{-a}$$

wherein $T_1$, T and C are as defined in the expression (5).

The requirement (C) defining the block copolymer of the present invention shows that the block copolymer has a high degree of block segment formation and that the aliphatic polyester content is inhibited to remarkably low degrees.

That is, the requirement (C) defines that the block copolymer of the present invention exhibits the extraction amount which satisfies the expression (6), when extracted in tetrahydrofuran, $$E<(100-C)\times0.4 \qquad (6)$$

wherein E is the extraction amount (wt. %) when the block copolymer is refluxed in tetrahydrofuran of which the weight is 100 times the weight of the block copolymer under heat for 2 hours, and C is the content (wt. %) of the polyamide block.

The above expression for example shows that when the polyamide block content is 50% by weight, the extraction amount in tetrahydrofuran is less than 20% by weight. An aliphatic polyester other than the block copolymer is not all that are included in the extract resulting from the extraction in tetrahydrofuran, while the extract at least includes an aliphatic polyester which does not constitute the block segment.

The block copolymer of the present invention preferably exhibits the extraction amount which satisfies the following expression, $$E < (100-C) \times 0.3 \quad (6)\text{-a}$$

wherein E and C are as defined in the expression (5).

The final requirement (D) defining the block copolymer of the present invention is that the block copolymer of the present invention has an intrinsic viscosity, measured in a phenol/1,1,2,2-tetrachloroethane mixed solvent (weight ratio 60/40) at 35° C., in the range of from 0.5 to 5. This intrinsic viscosity at 35° C. is preferably in the range of from 0.6 to 3.

The block copolymer of the present invention is used in a variety of fields as will be explained later. The block copolymer of the present invention also has its characteristic feature in that it is biodegradable.

According to the present invention, as a process for the production of a polyamide/aliphatic polyester block copolymer including the above block copolymer of the present invention, there is also provided a process comprising melt-reacting under heat (A) a polyamide composed substantially of at least one of a recurring unit of the formula (1), $$\begin{array}{cc} H & O \\ | & \| \\ -N-R_1-C- \end{array} \quad (1)$$

wherein $R_1$ is an alkylene group having 4 to 12 carbon atoms, and a recurring unit of the formula (2), $$\begin{array}{cccc} H & H & O & O \\ | & | & \| & \| \\ -N-R_2-N-C-R_3-C- \end{array} \quad (2)$$

wherein $R_2$ is an alkylene group having 4 to 12 carbon atoms or an alkylene-arylene-alkylene group having 8 to 16 carbon atoms, and $R_3$ is an alkylene group having 4 to 12 carbon atoms or an arylene group having 6 to 12 carbon atoms, and (B) at least one of an aliphatic polyester and ε-caprolactone (C) in the presence of an aromatic monohydroxy compound in an amount of 5 to 100 parts by weight per 100 parts by weight of the total amount of the above components (A) and (B) and in the presence of an ester interchange catalyst, and then distilling off the above aromatic monohydroxy compound.

In the process of the present invention, the polyamide (A) and at least one component (B) of an aliphatic polyester and ε-caprolactone are allowed to react in the presence of an aromatic hydroxy compound and an ester interchange catalyst by melting these components under heat.

The polyamide used as a raw material is composed substantially of at least one of the recurring unit of the above formula (1) and the recurring unit of the above formula (2).

The above formulae (1) and (2) are already explained.

Examples of the above polyamide include nylon 6, nylon 66, nylon 610, nylon 612, nylon 11, nylon 12, 35 nylon MXD6, nylon 46, polyhexamethyleneisophthalamide, polytrimethylhexamethyleneterephthalamide and a copolyamide obtained by copolymerizing at least two of these polyamides. Of these, nylon 6 and nylon 66 are preferred as the polyamide. These polyamides may be used alone or in combination. These polyamides prepared, for example, for producing a fiber, a film or a plastic may be used as they are. The molecular weight of the polyamide is not specially limited, while it is preferred to use, for example, a polyamide having an intrinsic viscosity, measured in m-cresol at 35° C., of approximately 0.3 to 3.0.

As the aliphatic polyester used as the other raw material, preferred is, for example, an aliphatic polyester composed substantially of at least one of the recurring unit of the above formula (3) and the recurring unit of the above formula (4).

Examples of the above aliphatic polyester include polycaprolactone, polypropiolactone, polyvalerolactone, polylactate, polyglycolate, polyethylene adipate, polyethylene succinate, polyethylene azelate, polyethylene sebacate, polytrimethylene sebacate, polytetramethylene sebacate, polyhexamethylene sebacate, polyoctamethylene sebacate, polydecamethylene sebacate, polyneopentylene sebacate and a copolyester obtained by copolymerizing at least two of these aliphatic polyesters. Of these, preferred are polycaprolactone, polyethylene sebacate, polytetramethylene sebacate and polyneopentylene sebacate. These polyesters may be used alone or in combination.

The molecular weight of the aliphatic polyester is not specially limited, while it is advantageous to use, for example, an aliphatic polyester having an intrinsic viscosity, measured in a phenol/1,1,2,2-tetrachloroethane mixed solvent (weight ratio 60/40) at 35° C., of approximately 0.03 to 3.0, preferably approximately 0.5 to 2.5.

In the process of the present invention, ε-caprolactone may be used in place of, or together with, the above aliphatic polyester.

In the process of the present invention, the weight ratio of the above polyamide/the aliphatic polyester and/or ε-caprolactone is preferably 5/95 to 90/10. When the proportion of the polyamide is less than 5, the resultant copolymer is poor in heat resistance. When it is greater than 90, the resultant copolymer is poor in properties exhibited by the copolymerization of the aliphatic polyester, such as biodegradability. The weight ratio of the polyamide/the aliphatic polyester and/or ε-caprolactone is preferably 7/93 to 85/15, particularly preferably 10/90 to 80/20.

In addition, ε-caprolactone undergoes ring-opening polymerization during the reaction during the melt-reaction.

The aromatic monohydroxy compound used in the reaction has the function as a compatibilizing agent between the polyamide and the aliphatic polyester, and as a result, causes a reaction of a terminal amino group and/or a carboxyl group of the polyamide, and the aliphatic polyester or an amide/ester interchange reaction of the polyamide and the polyester, whereby the intended block copolymer can be effectively obtained.

As the aromatic monohydroxy compound, preferred is a compound of the formula (7), $$\underset{\text{OH}}{\underset{|}{\bigcirc}}-(X)_m \quad (7)$$

wherein X is an alkyl group having 1 to 3 carbon atoms or a halogen atom, and m is an integer of 0 to 3.

Examples of the above monohydroxy compound includes phenol, m-cresol, p-cresol, o-cresol, 2,3-dimethylphenol, 2,4-dimethylphenol, 2,5-dimethylphenol, 2,6-dimethylphenol, 3,4-dimethylphenol, m-ethylphenol, o-ethylphenol, p-ethylphenol, p-propylphenol, o-propylphenol, m-propylphenol, o-chlorophenol, m-chlorophenol, p-chlorophenol, 2,4-dichlorophenol, 2,3-dichlorophenol, 2,5-dichlorophenol, and 2,4,6-trichlorophenol.

The amount of the aromatic monohydroxy compound per 100 parts by weight of the total amount of the polyamide and the aliphatic polyester and/or ε-caprolactone is 5 to 100 parts by weight. When the above amount of the aromatic monohydroxy compound is less than 5 parts by weight, undesirably, the function of the aromatic monohydroxy compound as the compatibilizing agent is insufficient. When the above amount is larger than 100 parts by weight, undesirably, the step of distilling off the aromatic monohydroxy compound after the polymerization takes a long period of time. The amount of the aromatic monohydroxy compound per 100 parts by weight of the total amount of the polyamide and the aliphatic polyester and/or ε-caprolactone is preferably 10 to 50 parts by weight.

The temperature for the reaction under heat is not specially limited, and it is sufficient to use a temperature at which the polyamide and the aliphatic polyester are dissolved or melted in the polymerization system. The temperature for the reaction is preferably 180° to 320° C., more preferably 200° to 300° C.

For promoting the above reaction, a catalyst is added to the melt-reaction system. The catalyst is selected from those known as an ester interchange catalyst. Examples of the catalyst preferably include alkali metal compounds, alkaline earth metal compounds and compounds of metals such as titanium, tin, zinc, antimony, manganese, cobalt and germanium. The amount of the catalyst is not specially limited, while it is preferably approximately 0.0001 to 0.1% by weight based on the block copolymer to be formed.

The time for the melt-reaction is not specially limited and differs depending upon the polymer composition and polymerization temperature, while it is approximately 30 minutes to 5 hours.

In the process of the present invention, the polyamide and at least one of the aliphatic polyester and ε-caprolactone are melt-mixed/reacted whereby the block copolymer can be obtained. As a final step, however, it is required to substantially remove the above aromatic monohydroxy compound from the polymerization system by distilling it off. The method for removing the aromatic monohydroxy compound includes a method in which the melting temperature is increased higher than the boiling point of the aromatic monohydroxy compound under the polymerization conditions. A method in which the pressure is reduced at the later-stage of the reaction is effective for decreasing the boiling point of the aromatic monohydroxy compound and distilling it off, and it can be preferably carried out. By removing the aromatic monohydroxy compound, there can be obtained the block copolymer composed substantially of the polyamide and the aliphatic polyester.

For the atmosphere for the polymerization, it is preferred to use an atmosphere of an inert gas such as nitrogen or argon under atmospheric pressure or elevated pressure at an initial stage of the reaction, and gradually decrease the pressure at a later stage of the reaction.

According to studies of the present inventors, it has been revealed that some of block copolymers that can be produced by the process of the present invention have the shape memory capability.

That is, according to the present invention, there is further provided a polyamide/polycaprolactone block copolymer; ks(A1) comprising a polyamide block composed substantially of at least one of a recurring unit of the formula (1)-a.

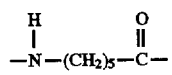

and a recurring unit of the formula (2)-b,

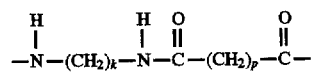

wherein k is an integer of 4 to 12 and p is an integer of 4 to 12, and a polycaprolactone block composed substantially of a recurring unit of the formula (3)-a,

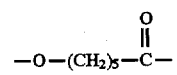

(B) satisfying the following expression (5), $$T_1 - T < 100 - C \qquad (5)$$

wherein T is the melting point (°C.) of the above block copolymer, $T_1$ is the melting point (°C.) of a polyamide composed of the polyamide block and C is the content (wt. %) of the polyamide block, (E) exhibiting the melting point derived from the polycaprolactone block in the range of from about 40° to 60° C., and (F) having shape memory and restoration capability.

The above block copolymer comprises a polyamide block composed substantially of at least one of the recurring unit of the formula (1)-a and the recurring unit of the above formula (2)-b and a polycaprolactone block composed substantially of the recurring unit of the above formula (3)-a.

The recurring unit of the formula (1)-a is a unit from the ring-opening of ε-caprolactam.

In the formula (2)-b, k is an integer of 4 to 12, and p is an integer of 4 to 12. Examples of —(CH$_2$)$_k$— and —(CH$_2$)$_p$— include tetramethylene, hexamethylene, octamethylene, decamethylene and dodecamethylene.

As the polyamide to compose the polyamide block, nylon 6 and nylon 66 are preferred.

The recurring unit of the above formula (3)-a is a unit from the ring-opening of caprolactone.

In the above block copolymer, preferably, the content of the polyamide block is 5 to 60% by weight, and the content of the polycaprolactone block is 95 to 40% by weight.

When the above content of the polyamide block is less than 5% by weight or larger than 60% by weight, the shape memory and restoration capability is insufficient. The polyamide block/polycaprolactone block weight ratio is preferably 7/93 to 50/50, more preferably 10/90 to 40/60.

In the above block copolymer, the length of each of the above polyamide block and polycaprolactone block is not specially limited, while these blocks preferably have chain lengths to such an extent that the melting point derived from the polycaprolactone and the melting point of the polyamide can be distinguishably observed when the block copolymer is thermally analyzed by DSC.

In the above block copolymer having the shape memory capability, the melting point (T) of the block copolymer and the melting point ($T_1$) of the polyamide block composing the block copolymer have the relationship which satisfies the above expression (5), preferably the above expression (5)-a.

The above block copolymer having the shape memory capability is required to have a melting point, derived from the polycaprolactone block, in the range of from approximately 40° to 60° C.

The above block copolymer has an intrinsic viscosity in the range of 0.5 to 5.0 when measured in a phenol/1,1,2,2-tetrachloroethane mixed solvent (weight ratio 60/40) at 35° C. When this intrinsic viscosity is less than 0.5, undesirably, the block copolymer is insufficient in mechanical properties and the shape memory and restoration capability. When it is higher than 5.0, undesirably, the moldability is poor.

The block copolymer having the shape memory capability can be properly produced by the already described method of the present invention.

A fiber having the dimension memory and restoration capability, i.e., a shape memory fiber, can be obtained by melt-spinning the above block copolymer having the shape memory capability.

The shape memory fiber of the present invention can be obtained by melt-spinning the above block copolymer. The above shape memory fiber can be produced by a known method in which a molten polymer is extruded through a spinning nozzle by means of a plunger method or extrusion method melt-extruder and the extrudate is cooled and solidified to form a fiber.

The temperature for melting the above polymer is preferably approximately between $T_1$ (melting point) of the polyamide component composing the block copolymer and 320° C., particularly preferably between about ($T_1$ of the polyamide component+10)°C. and about 300° C. The draft ratio for the spinning is preferably at least 5, particularly preferably at least 10.

The dimension memory fiber of the present invention may be a monofilament or a multifilament. The denier of the fiber is not specially limited, while the denier of a single yarn is preferably approximately 1 to 200.

The dimension memory fiber of the present invention exhibits the shape memory capability while it is in the state of an as-spun yarn, and it can be used as it is. For obtaining the higher shape memory capability, it is preferred to draw the as-spun yarn 1.5 to 6 times and subjecting the drawn yarn to a relaxation treatment at a temperature equal to, or higher than, 60° C. and lower than the $T_1$ (melting point) of the polyamide component. This treatment removes the strain which remains in the as-spun yarn obtained by the melt-spinning, and improves the shape memory capability.

The temperature for the above drawing is not specially limited, while it is preferably approximately between 0° and 100° C., more preferably 20° and 80° C. The draw ratio is preferably 1.5 to 6. When the draw ratio is less than 1.5, undesirably, it is difficult to draw the fiber uniformly. When the draw ratio is greater than 6, undesirably, the fiber is liable to break. The draw ratio is more preferably 2 to 5.

Then, the drawn yarn is subjected to a relaxation treatment at a temperature equal to, or higher than, 60° C. and lower than the $T_1$ of the polyamide component. When the temperature for the relaxation treatment is lower than 60° C., it is not sufficient to remove the strain of the as-spun yarn. When it is equal to, or higher than, the $T_1$ of the polyamide component, the polyamide undergoes melting. The temperature for the relaxation treatment is preferably between 60° C. and ($T_1$ of polyamide component −20)°C., particularly preferably between 60° C. and ($T_1$ of polyamide component− 40)°C.

The relaxation conditions are not specially limited, while the above drawn yarn may be relaxed under limitation or relaxed under no tension. It is preferably relaxed under no limitation and no tension. It may be drawn and relaxed by a known method using the take-up rate difference of rollers.

The dimension memory fiber of the present invention is constituted of a polyamide and polycaprolactone which are excellent in heat resistance and moldability, and is remarkably excellent in melt-spinnability.

Using a polyamide crystal phase as a fixed phase and a polycaprolactone crystal phase as a reversible phase, the shape memory fiber of the present invention is excellent in shape memory and restoration capability, and also excellent in durability in repeated use.

Due to the above properties, the shape memory fiber of the present invention can be used as a fiber material, a fabric and component for composite fibers. The above block copolymers of the present invention, including the block copolymer having the shape memory capability, exhibit excellent affinity to a thermoplastic resin which has no or poor compatibility with a polyamide since they have a polyamide block and an aliphatic polyester block.

According to the present invention, therefore, there is further provided an intimate blend comprising a thermoplastic resin having no or poor compatibility with a polyamide, a polyamide resin and the block copolymer of the present invention as a compatibilizing agent, and there is also provided an intimate blend comprising a thermoplastic resin having no or poor compatibility with a polyamide and the block copolymer of the present invention.

Typical examples of the above thermoplastic resin include a polyester resin, a polycarbonate resin, a polyester carbonate resin, a polystyrene-containing resin and a polyphenylene oxide resin.

The above polyester resin is obtained by the polycondensation of an aromatic dicarboxylic acid and a diol.

Examples of the aromatic dicarboxylic acid include terephthalic acid, isophthalic acid, naphthalene-2,6-dicarboxylic acid, naphthalene-2,7-dicarboxylic acid, diphenyl dicarboxylic acid, diphenyl ether dicarboxylic acid, diphenyl sulfone dicarboxylic acid and 5-carboxy-3-(4'-carboxyphenyl)-1,1,3-trimethlindane. These aromatic dicarboxylic acids may be used alone or in combination. Particularly preferred are terephthalic acid, isophthalic acid and naphthalene-2,6-dicarboxylic acid.

Examples of the diol include glycol, hydroquinone, resorcinol, dihydroxydiphenyl, bis(hydroxyphenyl)-alkane, bis-(hydroxyphenyl)-cycloalkane, bis(hydroxyphenyl)-sulfide, bis(hydroxyphenyl)-ether, bis-(hydroxyphenyl)-ketone, bis-(hydroxyphenyl)-sulfone, bis-(hydroxyphenyl)-sulfoxide, pentamethyl-(hydroxyphenyl)-indanol, α, α'-bis-(hydroxyphenyl)-diisopropylbenzene, and compounds prepared by alkylating or halogenating the benzene ring(s) of these compounds. Typical examples which are most generally used are ethylene glycol, butylene glycol and 2,2-bis(4-hydroxyphenyl)propane (to be abbreviated as "bisphenol A" hereinafter). The above diols may be used in combination.

For obtaining a resin composition (blend) having desirable properties, it is preferred to use a polyester having an intrinsic viscosity, measured in a phenol/1,1,2,2-tetrachloroethane mixed solvent (weight ratio 60/40) at 35° C., of at least 0.4.

The above polycarbonate resin is obtained from a diphenol or its derivative and carbonic acid or its derivative.

Examples of the diphenol include hydroquinone, resorcinol, dihydroxydiphenyl, bis(hydroxyphenyl)-alkane, bis-(hydroxyphenyl)-cycloalkane, bis(hydroxyphenyl)-sulfide, bis(hydroxyphenyl)-ether, bis-(hydroxyphenyl)-ketone, bis-(hydroxyphenyl)-sulfone, bis-(hydroxyphenyl)-sulfoxide, pentamethyl-(hydroxyphenyl)-indanol, α, α'-bis-(hydroxyphenyl)-diisopropylbenzene, and compounds prepared by alkylating or halogenating the benzene ring(s) of these compounds. The most generally and typically used is "bisphenol A". The above diphenols may be used in combination.

In addition to the carbonic acid or its derivative, a small amount of other aromatic or aliphatic dicarboxylic acid or its derivative may be used as a comonomer.

The derivatives of the diphenol and carbonic acid refer to esters, salts and halides of these.

For obtaining a resin composition (blend) having desirable properties, it is preferred to use a polycarbonate having a viscosity-average molecular weight of 15,000 to 40,000.

Polystyrene-containing resin includes acrylonitrile styrene, acrylonitrile butadiene styrene, etc.

Further, the above polyester carbonate resin, polystyrene-containing resin and polyphenylene oxide resin do not have to be any special ones, and can be selected from general resins known per se.

In the above intimate blend containing the block copolymer of the present invention as a compatibilizing agent, the amount of the block copolymer of the present invention per 100 parts by weight of the total of the above thermoplastic resin and the polyamide resin is preferably 1 to 50 parts by weight, more preferably 2 to 40 parts by weight, particularly preferably 3 to 30 parts by weight.

In the above case, the thermoplastic resin/polyamide resin weight ratio is preferably 95/5 to 5/95, more preferably 90/10 to 10/90.

The polyamide resin as an object includes a variety of polyamide resins obtained by the polycondensation of a three- or more-membered lactam, ω-aminocarboxylic acid, dibasic acid and diamine.

Specifically, the polyamide resin includes polymers of ε-caprolactam, aminocaproic acid, enatholactam, 7-aminoheptanoic acid and 11-aminoundecanoic acid, and polymers or copolymers obtained by the polycondensation of diamines such as butanediamine, hexamethylenediamine, nonamethylenediamine, undecamethylenediamine and m-xylylenediamine and dicarboxylic acids such as terephthalic acid, isophthalic acid, adipic acid, sebacic acid, dodecanoic dibasic acid and glutaric acid.

More specifically, the polyamide resin includes aliphatic polyamide resins such as nylon 6, nylon 46, nylon 66, nylon 610, nylon 11, nylon 12, nylon MXD6 and nylon 612, and aromatic polyamides such as polytrimethylhexamethylene-terephthalamide and polyhexamethyleneisophthalamide.

The polyamide resin used in the present invention preferably has an intrinsic viscosity in the range of from 0.5 to 3.0, as an index for molecular weight, when measured in m-cresol at 35° C.

In the intimate blend containing the thermoplastic resin and the block copolymer of the present invention, the amount of the block copolymer of the present invention per 100 parts by weight of the thermoplastic resin is preferably 1 to 200 parts by weight, more preferably 2 to 100 parts by weight.

The above two intimate blends of the present invention may contain fibrous reinforcing materials such as a glass fiber, a metal fiber, an aramid fiber, a ceramic fiber, potassium titanate whisker, a carbonate fiber and asbestos, and various fillers such as talc, calcium carbonate, mica, clay, titanium oxide, aluminum oxide, glass flakes, a milled fiber, metal flakes and a metal powder as required. Further, the two intimate blends of the present invention may contain at least one of additives such as a heat stabilizer, an oxidation stabilizer, a light stabilizer, a lubricant, a pigment, a flame retarding agent and a plasticizer.

The method for producing the above intimate blends of the present invention is not specially limited, while they can be easily produced by melt-kneading the above various resins, the block copolymer of the present invention and optionally the above various additives, etc.

EXAMPLES

The present invention will be detailed hereinafter with reference to Examples, in which "part" stands for "part by weight".

The property values described in Examples were obtained by the following methods.

(Intrinsic viscosity)

The intrinsic viscosity of a block copolymer and that of a polyester were measured in a phenol/1,1,2,2-tetrachloroethane mixed solvent (weight ratio 60/40) at 35° C.

The intrinsic viscosity of a polyamide as a raw material was measured in m-cresol at 35° C.

(Heat characteristics)

A polymer was measured for heat characteristics by DSC at a temperature elevation rate of 10° C./minute.

(COOH group)

The terminal COOH group of a polyamide as a raw material was titrated in a benzyl alcohol solution using Phenol Red as an indicator and a 0.1N—NaOH benzyl alcohol solution.

($NH_2$ group)

The terminal $NH_2$ group was titrated in a m-cresol solution using a Tymol Blue as an indicator and a 0.1N-p-toluenesulfonic acid aqueous solution.

(Extraction amount)

Chips of a block copolymer were heat-refluxed in tetrahydrofuran whose amount was 100 times as large as the weight of the block copolymer for 2 hours, then filtered and dried. The extraction amount (wt. %) of the block copolymer in tetrahydrofuran was calculated on the basis of the weight of the resultant insolubles.

Example 1

A reactor having a stirrer and a vacuum distillation system was charged with 20 parts of particulate chips of nylon 6 having an intrinsic viscosity of 1.41, a terminal COOH group amount of 66 mols/$10^6$ g and a terminal $NH_2$ group amount of 15 mols/$10^6$ g, 80 parts of ε-caprolactone, 33 parts of p-chlorophenol and 0.06 part of tetrabutyl titanate, and these components were heated up to 240° C. under atmospheric pressure in a nitrogen current. After about 10 minutes, the nylon 6 chips were melted or dissolved to form a uniform solution. This solution was allowed to react for 90 minutes under the same conditions. During the reaction, the reaction solution showed a gradual increase in viscosity to form a slightly turbid transparent liquid. The reaction solution was temperature-increased up to 260° C., and the pressure was gradually decreased such that it was in a vacuum state of about 20 mmHg after 10 minutes and further in a very high vacuum state of 1 mmHg or lower after 10 minutes therefrom. Then, the solution was allowed to react for 30 minutes under the same conditions. During these procedures, p-chlorophenol and unreacted ε-caprolactone were distilled off from the polymerization system (distillation amount 41 parts).

The so-obtained polymer was a slightly turbid yellowish transparent polymer in a molten state, and it had an intrinsic viscosity of 2.33 and showed two melting peaks of 58° C. and 207° C. Further, the extraction amount was 14%. FIG. 1 is the scanning electron microscopic photograph of the polymer.

Comparative Example 1

Figure 2:
FIG. 2 is a scanning electron microscopic photograph of a conventional block copolymer (Comparative Example 1).

The polymerization was carried out in the same manner as in Example 1 except that p-chlorophenol was not used. The resultant polymer was opaque in a molten state, and it had an intrinsic viscosity of 1.86 and showed two melting peaks of 59° C. and 219° C. When subjected to the extraction treatment, the polymer was almost all dissolved and the extraction solution was in a white suspension state. FIG. 2 is the scanning electron microscopic photograph of the polymer.

Example 2

The polymer obtained in Example 1 or Comparative Example 1 was melt-extruded through a nozzle having a diameter of 0.5 mm and a length of 1 mm with a Koka-type flow tester at 250° C. The polymer obtained in Example 1 showed excellent fluidity and melt-spinnability and gave a transparent monofilament, while the polymer obtained in Comparative Example 1 showed poor melt-spinnability and gave a white opaque monofilament. These results show that the polyamide and the polycaprolactone formed a block copolymer having very high uniformity in structure in the production process of the present invention.

Example 3

A reactor having a stirrer and a vacuum distillation system was charged with 20 parts of chips of nylon 6 having an intrinsic viscosity of 0.83, a terminal COOH group amount of 140 mols/$10^6$ g and a terminal $NH_2$ group amount of 3 mols/$10^6$ g, 80 parts of ε-caprolactone, 16 parts of phenol and 0.05 part of tetrabutyl titanate, and these components were heated up to 250° C. under atmospheric pressure in a nitrogen current to react for 180 minutes. Then, the reaction mixture was temperature-increased up to 260° C., and gradually pressure-decreased such that it was in a vacuum state at about 20 mmHg after 10 minutes and further in a very high vacuum state of 1 mmHg or lower after 10 minutes therefrom. Then, the reaction mixture was allowed to react for 25 minutes under the same conditions. During this reaction under vacuum, phenol and unreacted ε-caprolactone were distilled off from the polymerization system (distillation amount 21 parts).

The so-obtained polymer was slightly yellowish in a molten state, and it had an intrinsic viscosity of 2.18 and showed two melting peaks of 53° C. and 201° C. Further, the extraction amount was 11%.

Example 4

A reactor having a stirrer and a vacuum distillation system was charged with 20 parts of nylon 66 having an intrinsic viscosity of 1.18, a terminal COOH group amount of 83 mols/$10^6$ g and a terminal $NH_2$ group amount of 49 equivalents/$10^6$ g, 80 parts of ε-caprolactone, 33 parts of p-chlorophenol and 0.06 part of tetrabutyl titanate, and these components were allowed to react at 260° C. under atmospheric pressure in a nitrogen current for 90 minutes, at the same temperature under a weak vacuum of about 20 mmHg for 15 minutes and under a high vacuum of 1 mmHg or lower for 15 minutes. During this reaction under vacuum, p-chlorophenol and unreacted ε-caprolactone were distilled off (distillation amount 42 parts).

The so-obtained polymer was slightly turbid in a molten state, and it had an intrinsic viscosity of 2.63 and showed two melting peaks of 46° C. and 233° C. Further, the extraction amount was 10%.

Examples 5, 6 and 7

Predetermined amounts (shown in Table 1) of nylon 6 having an intrinsic viscosity of 1.41, a terminal COOH group amount of 66 mols/$10^6$ g and a terminal $NH_2$ group amount of 15 mols/$10^6$ g and ε-caprolactone, and 33 parts of p-chlorophenol and 0.06 part of tetrabutyl titanate were polymerized in the same manner as in Example 1. The so-obtained polymers were slightly turbid in a molten state. When these polymers were melt-extruded in the same manner as in Example 2, they were all excellent in melt-spinnability and gave transparent glossy monofilaments. Table 1 shows the intrinsic viscosity, melting points and tetrahydrofuran extraction amount of each of the polymers.

TABLE 1

| | Nylon 6 (part) | ε-Capro-lactone (part) | Intrinsic viscosity | Melting point (°C.) | Extraction amount (wt. %) |
|---|---|---|---|---|---|
| Ex. 5 | 40 | 60 | 1.83 | 53, 209 | 8.4 |
| Ex. 6 | 60 | 40 | 1.59 | 46, 210 | 4.2 |
| Ex. 7 | 80 | 20 | 1.22 | 213 | 1.3 |

Example 8

A reactor having a stirrer and a vacuum distillation system was charged with 20 parts of particulate chips of nylon 6 having an intrinsic viscosity of 0.85, a terminal COOH group amount of 140 mols/$10^6$ g and a terminal $NH_2$ group amount of 8 mols/$10^6$ g, 80 parts of polycaprolactone (Placcel H-7, supplied by Daicel Chemical Industries, Ltd.), 33 parts of p-chlorophenol and 0.06 part of tetrabutyl titanate, and these components were heated up to 250° C. under atmospheric pressure in a nitrogen current. After about 10 minutes, the nylon 6 chips were melted or dissolved to form a molten suspension. This suspension was allowed to react for 90 minutes under the same conditions. During the reaction, the reaction mixture showed a gradual decrease in viscosity to form a slightly turbid transparent liquid. The reaction mixture was temperature-increased up to 260° C., and the pressure was gradually decreased such that it was in a vacuum sate of about 20 mmHg after 10 minutes and further in a very high vacuum state of 1 mmHg or lower after 10 minutes therefrom. Then, the reaction mixture was allowed to react for 30 minutes under the same conditions. During these procedures, p-chlorophenol was distilled off from the polymerization system (distillation amount 41 parts).

The so-obtained polymer was a slightly turbid yellowish transparent polymer in a molten state, and it had an intrinsic viscosity of 2.23 and showed two melting peaks of 58° C. and 206° C. Its fusion temperature was 152° C. Further, the extraction amount in tetrahydrofuran was 13%.

A piece of the above polymer was placed on a hot plate equipped with a surface thermometer and a temperature adjuster, and the temperature of the hot plate was gradually increased. A temperature at which the piece of the polymer was melted and fused to the hot plate surface was taken as a fusion temperature, which was used as an index for heat resistance.

Comparative Example 2

The polymerization was carried out in the same manner as in Example 8 except that p-chlorophenol was not used. The resultant polymer was opaque in a molten state, and it had an intrinsic viscosity of 1.16 and showed two melting peaks of 60° C. and 218° C. and a fusion temperature of 57° C. When subjected to the extraction treatment in tetrahydrofuran, almost no insolubles remained, and the extraction solution was in a white suspension state.

Example 9

The polymer obtained in Example 8 or Comparative Example 2 was melt-extruded through a nozzle having a diameter of 0.5 mm and a length of 1 mm with a Koka-type flow tester at 210° C. The polymer obtained in Example 8 showed excellent fluidity and melt-spinnability and gave a transparent monofilament, while the polymer obtained in Comparative Example 2 showed poor melt-spinnability and gave a white opaque monofilament. These results show that the polyamide and the aliphatic polyester formed a block copolymer having very high uniformity in structure in the production process of the present invention.

Example 10

A reactor having a stirrer and a vacuum distillation system was charged with 50 parts of dimethyl sebacate, 200 parts of tetramethylene glycol and 0.06 parts of tetrabutyl titanate, and these components were heated up to 200° C. under atmospheric pressure in nitrogen current to carry out a general ester interchange reaction. After 2 hours, a stoichiometric amount (about 64 parts) of methanol was found to be distilled off, and then the reaction mixture was heated up to 250° C. and heated at this temperature for 2 hours. Then, the pressure was gradually decreased such that it was in a vacuum state of about 20 mmHg after 10 minutes and further in a very high vacuum state of 1 mmHg or lower after 10 minutes therefrom. During these procedures, the reaction mixture showed a gradual increase in viscosity. The reaction mixture was maintained under the same conditions for 45 minutes to give an aliphatic polyester, polytetramethylene sebacate, which was a slightly yellowish transparent viscous material. This polyester has an intrinsic viscosity of 1.50.

Then, 50 parts of particulate chips of nylon, 6 having an intrinsic viscosity of 1.41, a terminal COOH group amount of 8 mols/$10^6$ g and a terminal $NH_2$ group amount of 14 mols/$10^6$ g was added, and melt-mixed with the above polyester. During these procedures, the reaction melt gradually turned turbid in yellowish white. After the formation of a mixture was found, 50 parts of p-chlorophenol was added, and the resultant mixture was allowed to melt and react by heating it at 250° C. for 60 minutes. During this reaction, the reaction melt altered from a turbid state in whitish yellow to a brown transparent uniform melt. Then, the pressure was gradually decreased such that it was in a vacuum state of about 20 mmHg after 10 minutes and further in a very high vacuum state of 1 mmHg or lower after 30 minutes, and the melt was allowed to react for 30 minutes under the same conditions. During this reaction, p-chlorophenol was distilled off from the polymerization system (distillation amount, about 49 parts).

The so-obtained polymer was a slightly turbid yellowish transparent polymer in a molten state, and it had an intrinsic viscosity of 1.06 and showed two melting peaks of 62° C. and 214° C. and a fusion temperature of 205° C. Further, the extraction amount in tetrahydrofuran was 5.6%.

Example 11

The polymerization was carried out in the same manner as in Example 10 except that tetramethylene glycol was replaced with neopentylene glycol. The resultant polymer was was opaque in a molten state, and it had an intrinsic viscosity of 2.07 and showed a melting peak of 209° C. and a fusion temperature of 170° C. Further, the extraction amount in tetrahydrofuran was 4.7%.

Comparative Examples 3 and 4

Examples 10 and 11 were repeated except that p-chlorophenol was not used. The resultant polymers were opaque in a molten state. Table 2 shows the intrinsic viscosity, melting point(s), fusion temperature and extraction amount of each polymer.

TABLE 2

| | Intrinsic viscosity | Melting point (°C.) | Fusion temperature (°C.) | Extraction amount (wt. %) |
|---|---|---|---|---|
| Ex. 10 | 1.06 | 62, 214 | 205 | 5.6 |
| Ex. 11 | 2.07 | 209 | 170 | 4.7 |
| CEx. 3 | 1.71 | 68, 224 | 73 | 56 |
| CEx. 4 | 1.45 | 216 | 25 | 53 |

Example 12

The reaction was carried out in the same manner as in Example 8 except that p-chlorophenol was replaced with phenol. The resultant polymer was a slightly turbid yellowish transparent polymer in a molten state, and it had an intrinsic viscosity of 2.20 and showed two melting peaks of 57° C. and 207° C. and a fusion temperature of 150° C. Further, the extraction amount in tetrahydrofuran was 15%.

Example 13

The reaction was carried out in the same manner as in Example 8 except that nylon 6 was replaced with particulate chips of nylon 66 having an intrinsic viscosity of 1.18, a terminal COOH group amount of 83 mols/$10^6$ g and a terminal $NH_2$ group amount of 49 mols/$10^6$ g, that the reaction initiation temperature was changed to 260° C. and that the reaction mixture after melted was temperature-increased to 270° C.

The resultant polymer was a slightly turbid yellowish transparent polymer in a molten state, and it had an intrinsic viscosity of 1.90 and showed two melting peaks of 53° C. and 230° C. and a fusion temperature of 210° C. Further, the extraction amount in tetrahydrofuran was 12 %.

Example 14

(Preparation of block copolymer)

A reactor having a stirrer and a vacuum distillation system was charged with 20 parts of particulate chips of nylon 6 having an intrinsic viscosity of 1.38, 80 parts of ε-caprolactone, 16 parts of phenol and 0.05 part of tetrabutyl titanate, and these components were heated up to 260° C. under atmospheric pressure in a nitrogen current. After about 10 minutes, the nylon 6 chips were melted or dissolved to form a uniform solution. This solution was allowed to react for 60 minutes under the same conditions. During the reaction, the reaction mixture showed a gradual increase in viscosity to form a slightly turbid transparent melt. Then, the pressure was gradually decreased and the melt was allowed to react under a vacuum of about 20 mmHg for 15 minutes and further under a very high vacuum of 1 mmHg or lower for 25 minutes. During this reaction under reduced pressure, phenol was distilled off.

The so-obtained polymer had an intrinsic viscosity of 2.14, and showed two melting peaks of 56° C. and 203° C. when measured by DSC.

Example 15

The block copolymer obtained in Example 14 was injection molded at a polymer temperature of 240° C., at a mold temperature of 20° C. and at a molding cycle of 70 seconds to prepare a plate-like test piece having a size of 12 mm×3 mm×63 mm. During the injection molding, the polymer showed excellent fluidity and moldability.

The above-prepared test piece was heated up to 80° C. to soften it, bent at its central portion at an angle of 180° and cooled at room temperature. By these procedures, the shape of the test piece in a bent state was completely fixed.

Then, the above test piece was reheated up to 80° C. to show a restoration of 88% from a bending angle of 180°.

Examples 16–18

Predetermined amounts of particulate chips of nylon 6 having an intrinsic viscosity of 1.38 and ε-caprolactone, and 18 parts, per 100 parts of the total of the above polymer components, of phenol and 0.05 part, per 100 parts of the same, of tetrabutyl titanate were polymerized in the same manner as in Example 14, to prepare block copolymers composed of nylon 6 and polycaprolactone.

The so-obtained polymers were injection molded, and evaluated for shape memory and restoration capability, in the same manner as in Example 15.

Table 3 shows the results. It is seen that the resin of the present invention is excellent in shape memory and restoration capability.

TABLE 3

|  | Nylon 6 (part) | ε-Capro-lactone (part) | Intrinsic viscosity | Melting point (°C.) | Shape restoration capability (%) |
| --- | --- | --- | --- | --- | --- |
| Ex. 16 | 15 | 85 | 2.80 | 56, 199 | 90 |
| Ex. 17 | 30 | 70 | 2.35 | 55, 207 | 88 |
| Ex. 18 | 40 | 60 | 1.87 | 53, 209 | 85 |

Example 19

A reactor having a stirrer and a vacuum distillation system was charged with 20 parts of chips of nylon 66 having an intrinsic viscosity of 1.18, 80 parts of ε-caprolactone, 25 parts of p-chlorophenol and 0.05 part of tetrabutyl titanate, and these components were allowed to react at 260° C. for 75 minutes in a nitrogen current under atmospheric pressure, under a weak vacuum of about 20 mmHg for 15 minutes and further under a very high vacuum of 1 mmHg or lower for 29 minutes. The so-obtained polymer had an intrinsic viscosity of 2.24, and showed two melting peaks of 49° C. and 235° C.

Example 20

The block copolymer obtained in Example 19 was injection molded at a polymer temperature of 250° C., at a mold temperature of 20° C. and at a molding cycle of about 75 seconds to prepare a plate-like test piece similar to that prepared in Example 15. This test piece was evaluated for shape memory and restoration capability in the same manner as in Example 15 to show a restoration of 90% from a bending angle of 180°.

Example 21

The polymer obtained in Example 14 was crashed, and then melt-spun through a nozzle having a diameter of 0.3 mm and a length of 0.7 mm by means of an apparatus equipped with a monohole spinning orifice at a polymer temperature of 210° C. In this case, the polymer showed excellent melt-spinnability. There was obtained a slightly brownish monofilament yarn having a size of 29 denier. Then, this yarn was drawn about 4 times at 30° C. by means of a drawing apparatus.

The above-obtained block copolymer drawn yarn was subjected to a relation treatment under no tension by maintaining it in an oven at 80° C. for 5 minutes.

(Evaluation for dimension memory capability)

The length of the yarn obtained by the above treatment was taken as 100, and the yarn was stretched up to a length of 150%. At this time, it was confirmed that the yarn (fiber) did not restore its original length (that the length was fixed at room temperature), and then the yarn was heat treated in oven at 80° C. for 5 minutes. The yarn was allowed to cool to room temperature, and then measured for a length for evaluating the shape restoration capability.

Figure 3:
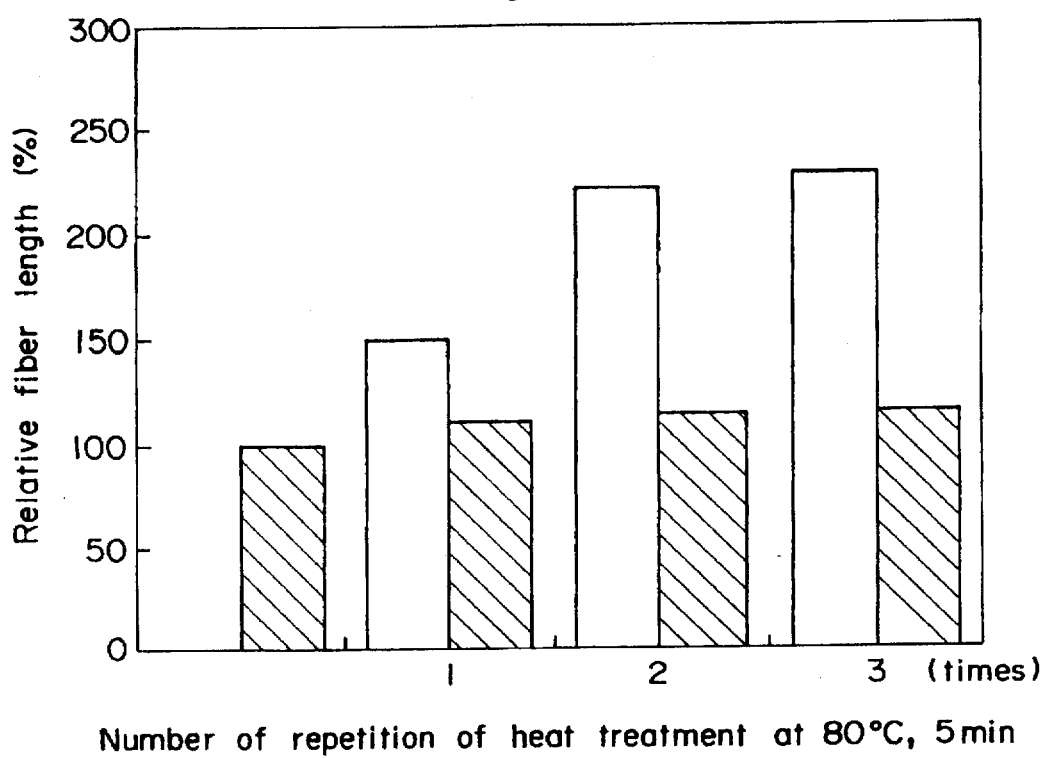
FIG. 3 shows the shape memory capability of a shape memory fiber (Example 21) obtained from a block copolymer of the present invention.

The heat-treated yarn nearly restored its original length. Further, the yarn was evaluated for restoration capability as the stretch ratio was increased. FIG. 3 shows the results. In FIG. 3, each void column indicates a length (%) up to which the yarn was stretched before heat treatment, and each slanting-lined column indicates a length (%) to which the yarn restored its length after heat treatment.

Example 22

Figure 4:
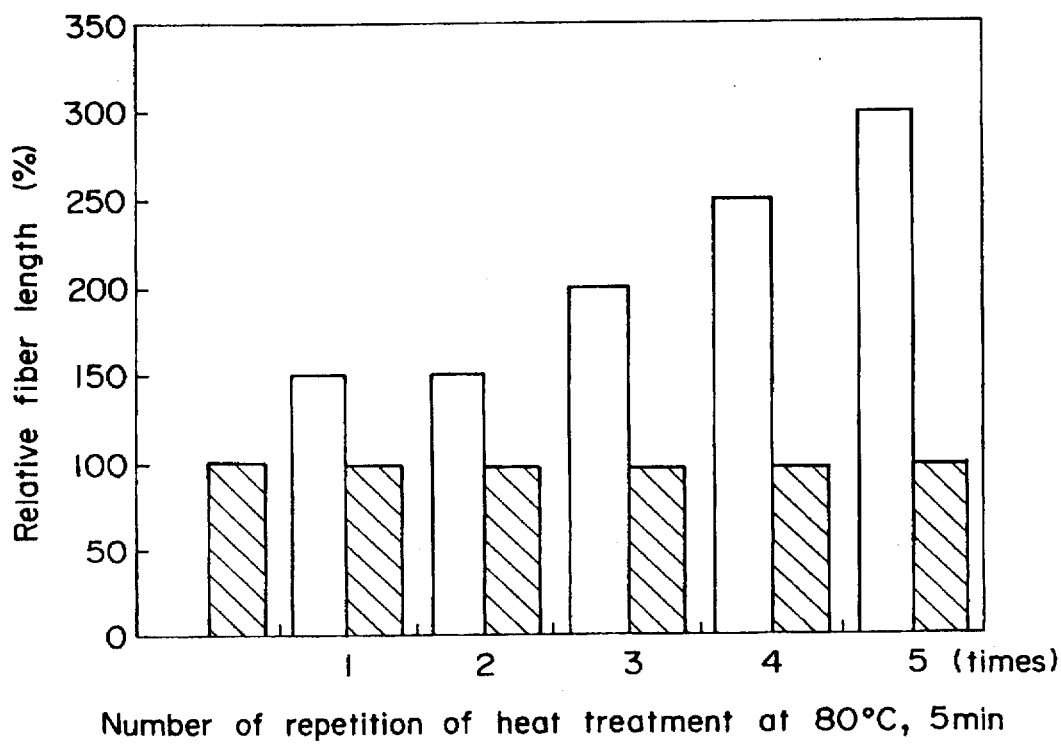
FIG. 4 is the shape memory capability of a shape memory fiber (Example 22) obtained from another block copolymer of the present invention.

The reaction was carried out in the same manner as in Example 21 except that nylon 6 as a polyamide was replaced with particulate chips of nylon 66 having an intrinsic viscosity of 1.18 and the heating temperature was changed to 270° C. The so-obtained polymer had an intrinsic viscosity of 2.24 and showed two crystal melting points at 44° C. and 234° C. when measured by DSC. A filament was produced from the above polymer in the same manner as in Example 21 and evaluated. FIG. 4 shows the results. Void columns and slanting-lined columns indicate the same meanings as in FIG. 3.

These results show that the fiber of the present invention has the excellent dimension restoration capability.

Examples 23–26 and Comparative Example 5

Each of the block copolymers obtained in Examples 1, 4, 5 and 8 was respectively melt-extruded through a slit having a width of 10 mm and a thickness of 1 mm at a polymer temperature of 230° to 250° C. to form tape-shaped samples having a width of about 7 mm and a thickness of about 0.5 mm. Each sample was cut to a length of 100 mm and burled about 20 cm deep in soil covered with lawn. After 180 days, the buried samples were taken out and measured for weights.

In Comparative Example 5, a polycaprolactone (Placcel H7, supplied by Daicel Chemical Industries, Ltd.) was molded in the same manner as above, and tested in the same manner as above.

Table 4 shows the results.

These results show that the block copolymer of the present invention exhibits biodegradability equivalent to, or higher than, that of polycaprolactone and has heat resistance which permits the use thereof at a temperature equal to, higher than, the melting point of polycaprolactone.

TABLE 4

| Block copolymer from: | Polymer composition (wt. %) | Melting point (°C.) | Weight retention after 180 days (wt. %) |
|---|---|---|---|
| Ex. 23 | Ex. 1 | nylon 6 (20) polycaprolactone 0) | 58, 207 | 63 |
| Ex. 24 | Ex. 4 | nylon 66 (20) polycaprolactone (80) | 46, 233 | 75 |
| Ex. 25 | Ex. 5 | nylon 6 (40) polycaprolactone (60) | 53, 209 | 70 |
| Ex. 26 | Ex. 8 | nylon 6 (20) polycaprolactone (80) | 58, 206 | 60 |
| CEx. 5 | — | polycaprolactone | 60 | 86 |

Examples 27–30 and Comparative Examples 6 and 7

Each of the polymers obtained in Examples 1, 4, 5 and 8 was respectively melt-extruded through a nozzle having a diameter of 0.3 mm and a length of 0.7 mm at a polymer temperature of 220° to 250° C., to prepare monofilaments. The monofilaments were drawn at 30° C. up to a predetermined draw ratio to obtain drawn yarns. Table 5 shows the mechanical properties of these yarns and amounts of soluble total organic carbon (TOC) hydrolyzed by enzyme.

In the test for the hydrolysis by enzyme, 10 ml of a 0.2M phosphoric acid buffer solution and 4 mg of lipase (trade name: Lipase, Lyophilized, Rhizopus delemer, Fine Grade, supplied by Seikagaku Corporation) as a degradation enzyme were added to 1 g of the fiber, and water was added such that the total amount became 20 ml. The mixture was allowed to react at 37° C. for 24 hours and measured for a total amount of solubilized organic carbon (TOC). The TOC in this case refers to a value obtained by deducting TOC of a sample containing no degradation enzyme and TOC obtained when the degradation enzyme alone was used. Table 5 shows the results.

Table 5 also shows the results of fibers from a polycaprolactone (Placcel H7, supplied by Daicel Chemical Industries, Ltd.) and nylon 6 (Intrinsic viscosity 1.21) for comparison (Comparative Examples 6 and 7).

It is seen that the drawn yarn formed from the block copolymer of the present invention has excellent mechanical properties and hydrolyzability by enzyme.

TABLE 5

| Block copolymer from: | Draw ratio | Tensile strength (g/de) | Elongation (%) | TOC (mg/l) |
|---|---|---|---|---|
| Ex. 27 | Ex. 1 | 5.5 | 3.6 | 46 | 940 |
| Ex. 28 | Ex. 4 | 6.0 | 4.2 | 45 | 870 |
| Ex. 29 | Ex. 5 | 5.0 | 3.8 | 40 | 730 |
| Ex. 30 | Ex. 8 | 5.0 | 3.2 | 38 | 910 |
| CEx. 6 | (polycaprolactone) | 6.0 | 1.7 | 31 | 1,300 |
| CEx. 7 | (nylon 6)* | 4.5 | 5.4 | 20 | 320 |

*: Draw temperature = 80° C.

Example 31

A reactor having a stirrer and a vacuum distillation system was charged with 50 parts of particulate chips of nylon 6 having an intrinsic viscosity of 1.41, 50 parts of ε-caprolactone, 25 parts of phenol and 0.06 part of tetrabutyl titanate, and these components were heated up to 220° C. under atmospheric pressure in a nitrogen current. After about 10 minutes, the nylon 6 chips were melted or dissolved to form a uniform solution. This solution was allowed to react for 90 minutes under the same conditions. During the reaction, the reaction mixture showed a gradual increase in viscosity to become a slightly turbid transparent liquid. Then, the temperature was increased to 260° C., and the pressure was gradually decreased such that it was under a vacuum of about 20 mmHg after 10 minutes and further in a high vacuum state at 1 mmHg or lower after 10 minutes therefrom. Then, the liquid was allowed to react under the same conditions for 30 minutes. During this reaction, phenol and unreacted ε-caprolactone were distilled off from the polymerization system.

The so-obtained polymer was a slightly turbid yellowish transparent polymer, and it had an intrinsic viscosity of 2.16 and showed two melting peaks at 56° C. and 209° C. The extraction amount in tetrahydrofuran was 3.8%.

Example 32

A reactor having a stirrer and a vacuum distillation system was charged with 40 parts of particulate chips of nylon 6 having an intrinsic viscosity of 0.85, 60 parts of polycaprolactone (Placcel H7, supplied by Daicel Chemical Industries, Ltd.), 33 parts of p-chlorophenol and 0.06 part of tetrabutyl titanate, and these components were heated up to 250° C. under atmospheric pressure in a nitrogen current. After about 10 minutes, the nylon 6 chips were melted or dissolved to form a uniform solution. This solution was allowed to react for 90 minutes under the same conditions to become a slightly turbid transparent liquid. Then, the temperature was increased to 260° C., and the pressure was gradually decreased such that it was under a vacuum of about 20 mmHg after 10 minutes and further in a high vacuum state at 1 mmHg or lower after 30 minutes therefrom. Then, the liquid was allowed to react under the same conditions for 30 minutes. During this reaction, p-chlorophenol was distilled off from the polymerization system.

The so-obtained polymer was a slightly turbid yellowish transparent polymer in a molten state, and it had an intrinsic viscosity of 1.84 and showed two melting peaks at 57° C. and 207° C. The extraction amount in tetrahydrofuran was 5.6%.

Examples 33–37 and Comparative Example 8

Predetermined amounts of a polycarbonate resin (Trade name: Panlite L1250, supplied by Teijin Chemicals Ltd), a nylon 6 resin having an intrinsic viscosity of 1.4 and the block copolymer obtained in Examples 31 or 32 were dried by a conventional method, and then melt-blended with a twin screw extruder having 30 mmφ unidirectionally revolving screws at a polymer temperature of 280° C. for an average residence time of about 3 minutes.

The above-obtained composition was injection molded by means of an injection molding machine (M-50B, supplied by Meiki Seisakusho) at a polymer temperature of 280° C. at a mold temperature of 80° C. at a molding cycle of 90 seconds to prepare test pieces. Table 6 shows the properties of the test pieces. For comparison, Table 6 also shows the results of a composition containing no block copolymer. These results show that the resin composition of the present invention is excellent in mechanical properties, in particular, remarkably improved in impact resistance.

Since a polycarbonate resin and a polyamide resin had no compatibility with each other, a molded article obtained in Comparative Example 8 had a surface having pearl-like patterns, while molded articles obtained from the compositions of the present invention were free of a speckled surface and each composition was in a microdispersion state since the above two components were improved in compatibility.

The above-obtained composition was injection molded by means of an injection molding machine (M-50B, supplied by Meiki Seisakusho) at a polymer temperature of 280° C. at a mold temperature of 80° C. at a molding cycle of 90 seconds to prepare test pieces. Table 7 shows the properties of the test pieces. For comparison, Table 7 also shows the results of compositions containing no multi-block copoly-

TABLE 6

|  | unit | Ex. 33 | Ex. 34 | Ex. 35 | Ex. 36 | Ex. 37 | CEx. 8 |
|---|---|---|---|---|---|---|---|
| COMPOSITION |  |  |  |  |  |  |  |
| Polycarbonate | (part) | 45 | 50 | 40 | 45 | 60 | 50 |
| Polyamide | (part) | 45 | 40 | 40 | 45 | 30 | 50 |
| Block copolymer | (part) | Ex. 31 | Ex. 31 | Ex. 31 | Ex. 32 | Ex. 32 | — |
|  |  | 10 | 10 | 20 | 10 | 10 |  |
| PROPERTIES OF MOLDED ARTICLE |  |  |  |  |  |  |  |
| Tensile strength | (kg/cm$^2$) | 560 | 590 | 570 | 590 | 620 | 380 |
| Flexural strength | (kg/cm$^2$) | 730 | 690 | 630 | 750 | 770 | 660 |
| Flexural modulus | (kg/cm$^2$) | 16,800 | 17,200 | 14,000 | 17,000 | 18,200 | 20,600 |
| Impact strength Izod, notched | (kg · cm/cm) | 7.4 | 9.1 | 14.2 | 7.8 | 11.6 | 3.6 |
| Water absorption percentage (23° C., 24 hr) | (%) | 1.0 | 0.9 | 1.1 | 1.0 | 0.7 | 1.1 |
| Solvent resistance* | (%) | 1.5 | 1.8 | 2.3 | 1.6 | 2.8 | 2.0 |

*: Weight increase ratio when a sample was immersed in xylene at 23° C. for 24 hours.

Examples 38–40 and
Comparative Examples 9 and 10

Predetermined amounts of either a polybutylene terephthalate resin (intrinsic viscosity 0.88, supplied by Teijin Ltd.) or a polyarylate (U-100, supplied by Unitika, Ltd.), a nylon 6 resin having an intrinsic viscosity of 1.4 and the block copolymer obtained in Examples 31 or 32 were dried by a conventional method, and then melt-blended with a twin screw extruder having 30 mmφ unidirectionally revolving screws at a polymer temperature of 280° C. for an average residence time of about 3 minutes.

mer. These results show that the resin composition of the present invention is excellent in mechanical properties, in particular, remarkably improved in impact resistance.

Further, since a polyester resin and a polyamide resin have no compatibility with each other, a molded article obtained in Comparative Example 9 had a surface having pearl patterns, while molded articles obtained from the compositions of the present invention were free of a speckled surface and each composition was in a microdispersion state since the above two components were improved in compatibility.

TABLE 7

|  | unit | Ex. 38 | Ex. 39 | Ex. 40 | CEx. 9 | CEx. 10 |
|---|---|---|---|---|---|---|
| COMPOSITION |  |  |  |  |  |  |
| Polybutylene terephthalate | (part) | 45 | 50 | — | 50 | — |
| Polyarylate | (oart) | — | — | 25 | — | 30 |
| Polyamide | (part) | 45 | 40 | 65 | 50 | 70 |
| Block copolymer | (part) | Ex. 31 | Ex. 32 | Ex. 32 | — | — |
|  |  | 10 | 10 | 10 |  |  |
| PROPERTIES OF MOLDED ARTICLE |  |  |  |  |  |  |
| Tensile strength | (kg/cm$^2$) | 522 | 511 | 1,120 | 516 | 806 |
| Elongation | (%) | 191 | 196 | 98 | 180 | 51 |
| Flexural strength | (kg/cm$^2$) | 754 | 740 | 860 | 733 | 854 |
| Flexural modulus | (kg/cm$^2$) | 18,700 | 17,500 | 19,100 | 18,500 | 18,100 |
| Impact strength Izod, notched | (kg · cm/cm) | 8.1 | 7.5 | 10.5 | 4.5 | 5.2 |

Examples 41–44 and Comparative Examples 11 and 12

Each of the block copolymers obtained in Examples 1, 5, 6 and 7 were injection molded at a polymer temperature of 230° C. at a mold temperature 30° C. Table 8 shows the properties of the so-obtained articles.

For comparison, Table 8 also shows the properties of molded articles from nylon 6 (intrinsic viscosity 1.41) and a polycaprolactone (Placcel H-4, supplied by Dalcel Chemical Industries, Ltd.). It is seen that the block copolymer of the present invention has remarkably high impact resistance.

TABLE 8

|  | Ex. 41 | Ex. 42 | Ex. 43 | Ex. 44 | CEx. 11 | CEx. 12 |
|---|---|---|---|---|---|---|
| Block copolymer from: | Ex. 1 | Ex. 5 | Ex. 6 | Ex. 7 | — | — |
| POLYMER COMPOSITION |  |  |  |  |  |  |
| Nylon 6 | (20) | (40) | (60) | (80) | (100) | (0) |
| Polycaprolactone (wt. %) | (80) | (60) | (40) | (20) | (0) | (100) |
| PROPERTIES OF MOLDED ARTICLE |  |  |  |  |  |  |
| Tensile strength (kg/cm$^2$) | 220 | 290 | 490 | 560 | 1,400 | 210 |
| Elongation at break (%) | >500 | 350 | 380 | 240 | 130 | >500 |
| Flexural strength (kg/cm$^2$) | 120 | 140 | 140 | 310 | 880 | 210 |
| Flexural modulus (kg/cm$^2$) | 2,900 | 3,500 | 3,500 | 7,700 | 21,000 | 5,100 |
| Impact strength ⅛", notched (kg · cm/cm) | NB | NB | NB | NB | 3.8 | 4.5 |
| Surface hardness (Shore D) | 55 | 58 | 63 | 71 | 85 | 64 |

NB: not break

Example 45 and Comparative Example 13

70 Parts of a polycarbonate (trade name: Panlite L1250, supplied by Teijin Chemicals Ltd) and 30 parts of the block copolymer obtained in Example 7 were dry-blended, and the blend was injection molded at a polymer temperature of 280° C. at a mold temperature of 80° C. Table 9 shows the properties of the so-obtained molded article. For comparison, Table 9 also shows the properties of a molded article from a blend containing nylon 6 (intrinsic viscosity 1.21) in place of the block copolymer.

TABLE 9

|  | Example 45 | Comparative Example 13 |
|---|---|---|
| POLYMER COMPOSITION (wt. %) |  |  |
| Polycarbonate | 70 | 70 |
| Block copolymer | 30 | — |
| Nylon 6 | — | 30 |
| Tensile strength (kg/cm$^2$) | 500 | 440 |
| Elongation at break (%) | 140 | 30 |
| Flexural strength (kg/cm$^2$) | 720 | 780 |
| Flexural modulus (kg/cm$^2$) | 19,000 | 22,300 |
| Impact strength ⅛", notched (kg · cm/cm) | 12.5 | 4.2 |
| Heat deformation temperature (°C.) | 118 | 119 |

Examples 46 and 47 and Comparative Examples 14 and 15

40 Parts of either ABS resin (UT$_{61}$, supplied by Mitsui Toatsu Chemicals, Inc.) or AS resin (AS-230, supplied by Japan Synthetic Rubber Co., Ltd.), 40 parts of nylon 6 (intrinsic viscosity 1.21) and 20 parts of the block copolymer obtained in Example 31 were dry-blended, and the blend was injection molded at a polymer temperature of 230° C. at a mold temperature of 30° C. Further, the injection molding was carried out in the same manner as above except that the block copolymer was not used. Table 10 shows the properties of the so-obtained molded articles. These results show that the block copolymer of the present invention is effective as a compatibilizing agent.

TABLE 10

|  | Ex. 46 | Ex. 47 | CEx. 14 | CEx. 15 |
|---|---|---|---|---|
| POLYMER COMPOSITION (wt. %) |  |  |  |  |
| ABS resin | 40 | — | 40 | — |
| AS resin | — | 40 | — | 40 |
| Nylon 6 | 40 | 40 | 40 | 40 |
| Block copolymer | 20 | 20 | — | — |
| Tensile strength (kg/cm$^2$) | 480 | 530 | 510 | 560 |
| Elongation | 270 | 320 | 20 | 5 |

TABLE 10-continued

|  | Ex. 46 | Ex. 47 | CEx. 14 | CEx. 15 |
|---|---|---|---|---|
| at break (%) |  |  |  |  |
| Flexural strength (kg/cm²) | 720 | 860 | 850 | 900 |
| Flexural modulus (kg/cm²) | 19,000 | 24,000 | 21,400 | 29,000 |
| Impact strength ⅛", notched (kg · cm/cm) | 9.5 | 7.1 | 5.6 | 2.3 |

Example 48

50 Parts of AS resin (AS-230, supplied by Japan Synthetic Rubber Co., Ltd.) and 50 parts of the block copolymer obtained in Example 7 were dry-blended, and the blend was injection molded at a polymer temperature of 225° C. at a mold temperature of 30° C. The resultant molded article showed a tensile strength of 580 kg/cm², an elongation of 180% at break, a flexural strength of 890 kg/cm², a flexural modulus of 25,800 kg/cm² and an impact strength of 6.8 kg.cm/cm.

Example 49

The polymerization was carried out in the same manner as in Example 31 except that 5 parts of sodium dimethyl 5-sulfoisophthalate and 2 parts of 3-methyl-1,5-pentanediol were added and that the reaction time at 220° C. was changed to 180 minutes. The so-obtained polymer was yellowish transparent, and had an intrinsic viscosity of 1.62 and a melting point of 188° C.

The above polymer was injection molded in the same manner as in Example 41 to prepare a disk-shaped molded article having a diameter of 50 mm and a thickness of 2 mm. The molded article was allowed to stand at 20° C. at a relative humidity of 65%, and then measured for a surface resistivity at a voltage of 1,000 V with an ultra-insulation measuring meter (SM-8210 supplied by Towa Denpa Kogyo K. K.) according to JIS K6911 to show $1.8 \times 10^{10} \Omega$.

What is claimed is:

1. An intimate blend comprising a thermoplastic resin having no or poor compatibility with polyamide, a polyamide resin and a compatibilizing agent, said thermoplastic resin being selected from the group consisting of a polyester resin, a polycarbonate resin, a polyester carbonate resin, an acrylonitrile-butadiene-styrene resin, an acrylonitrile-styrene resin and a polyphenylene oxide resin, and said compatibilizing agent being a polyamide/aliphatic polyester block copolymer comprising (A) (I) a polyamide block composed substantially of at least one recurring unit selected from the group consisting of a recurring unit of the formula (1),

wherein $R_1$ is an alkylene group having 4 to 12 carbon atoms, a recurring unit of the formula (2)

wherein $R_2$ is an alkylene group having 4 to 12 carbon atoms or an alkylene-arylene-alkylene group having 8 to 16 carbon atoms, and $R_3$ is an alkylene group having 4 to 12 carbon atoms or an arylene group having 6 to 12 carbon atoms, and mixtures of recurring units of formula (1) and formula (2);

and (II) an aliphatic polyester block composed substantially of at least one recurring unit selected from the group consisting of a recurring unit of the formula (3)

wherein $R_4$ is an alkylene group having 1 to 12 carbon atoms, a recurring unit of the formula (4)

wherein $R_5$ is an alkylene group having 2 to 12 carbon atoms and $R_6$ is an alkylene group having 2 to 12 carbon atoms, and mixtures of recurring units of formula (3) and formula (4);

said block copolymer having the following properties (B), (C) and (D):

(B) satisfying the following expression (5), $$T_1 - T < 100 - C \quad (5)$$

wherein T is the melting point (°C.) of the above block copolymer, $T_1$ is the melting point (°C.) of a polyamide composed of the polyamide block and C is the content (wt. %) of the polyamide block, (C) exhibiting the extraction amount which satisfies the expression (6), when extracted in tetrahydrofuran, $$E < (100-C) \times 0.4 \quad (6)$$

wherein E is the extraction amount (wt. %) when the block copolymer is refluxed in tetrahydrofuran of which the weight is 100 times the weight of the block copolymer under heat for 2 hours, and C is the content (wt. %) of the polyamide block, and (D) having an intrinsic viscosity, measured at 35° C., in the range of from 0.5 to 5.

2. The intimate blend of claim 1 which comprises from 1 to 50 parts by weight of the compatibilizing agent per 100 parts by weight, in total, of the thermoplastic resin and the polyamide.

3. The intimate blend of claim 2 wherein the weight ratio of the thermoplastic resin to the polyamide is from 95/5 to 5/95.

4. The intimate blend of claim 4 wherein the amount of the compatibilizing agent is from 2 to 40 parts per 100 parts, in total, of the thermoplastic resin and polyamide.

5. The intimate blend of claim 1 which comprises from 3 to 30 parts by weight of the compatibilizing agent and 100 parts by weight, in total, of the thermoplastic resin and polyamide, and wherein the weight ratio of the thermoplastic resin to polyamide is in the range of from 90/10 to 10/90.

6. The intimate blend according to claim 1 wherein the thermoplastic resin is said polycarbonate resin.

7. The intimate blend according to claim 6 wherein the polycarbonate resin has a viscosity-average molecular weight of from 15,000 to 40,000.

8. The intimate blend of claim 1 wherein the recurring units of polyamide block (I) are nylon 6 or nylon 66 or mixture thereof and the recurring units of aliphatic polyester block (II) are polycaprolactone, polyethylene sebacate, polytetramethylene sebacate or polyneopentylene sebacate or mixture thereof.

9. The intimate blend of claim 1 wherein the polyamide resin comprises nylon 6.

10. The intimate blend of claim 9 wherein the block copolymer comprises as recurring units (I) nylon 6 and as recurring units (II) polycaprolactone.

11. The intimate blend of claim 10 wherein the thermoplastic resin comprises said polycarbonate resin.

12. The intimate blend of claim of claim 1 wherein the block copolymer comprises as recurring units (I) nylon 6 and as recurring units (II) polycaprolactone.

13. A method for forming an intimate blend of a thermoplastic resin having no or poor compatibility with a polyamide, and a polyamide, which comprises intimately blending a thermoplastic resin selected from the group consisting of a polyester resin, a polycarbonate resin, a polyester carbonate resin, an acrylonitrile-butadiene-styrene resin, an acrylonitrile-styrene resin and a polyphenylene oxide resin, and the polyamide in the presence of a compatibilizing agent comprising a polyamide/aliphatic polyester block copolymer comprising (A) a polyamide block composed substantially of at least one recurring unit selected from the group consisting of a recurring unit of the formula (1),

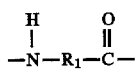 (1)

wherein $R_1$ is an alkylene group having 4 to 12 carbon atoms, recurring unit of the formula (2)

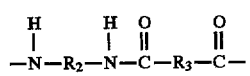 (2)

wherein $R_2$ is an alkylene group having 4 to 12 carbon atoms or an alkylene-arylene-alkylene group having 8 to 16 carbon atoms, and $R_3$ is an alkylene group having 4 to 12 carbon atoms or an arylene group having 6 to 12 carbon atoms, and mixtures of recurring units of formula (1) and formula (2);

and an aliphatic polyester block composed substantially of at least one recurring unit selected from the group consisting of a recurring unit of the formula (3)

 (3)

wherein $R_4$ is an alkylene group having 1 to 12 carbon atoms, a recurring unit of the formula (4)

 (4)

wherein $R_5$ is an alkylene group having 2 to 12 carbon atoms and $R_6$ is an alkylene group having 2 to 12 carbon atoms, and mixtures of recurring units of formula (3) and formula (4);

said block copolymer having the following properties (B), (C) and (D):

(B) satisfying the following expression (5), $$T_1-T<100-C \qquad (5)$$

wherein T is the melting point (°C.) of the above block copolymer, $T_1$ is the melting point (°C.) of a polyamide composed of the polyamide block and C is the content (wt. %) of the polyamide block, (C) exhibiting the extraction amount which satisfies the expression (6), when extracted in tetrahydrofuran, $$E<(100-C)\times 0.4 \qquad (6)$$

wherein E is the extraction amount (wt. %) when the block copolymer is refluxed in tetrahydrofuran of which the weight is 100 times the weight of the block copolymer under heat for 2 hours, and C is the content (wt. %) of the polyamide block, and (D) having an intrinsic viscosity, measured at 35° C., in the range of from 0.5 to 5.

14. The method of claim 13 wherein the step of intimately blending comprises melt-kneading the thermoplastic resin, the polyamide and the compatibilizing agent.

15. The method of claim 13 which comprises intimately blending from 1 to 50 parts by weight of the compatibilizing agent with 100 parts by weight, in total, of the thermoplastic resin and the polyamide.

16. The method of claim 15 wherein the thermoplastic resin and the polyamide are incorporated in the intimate blend at a weight ratio of from 95/5 to 5/95.

17. The method according to claim 13 wherein the thermoplastic resin is said polycarbonate resin.

18. The method according to claim 17 wherein the polycarbonate resin has a viscosity-average molecular weight of from 15,000 to 40,000.

19. An intimate blend comprising the product obtained by intimately blending a thermoplastic resin having no or poor compatibility with polyamide, a polyamide resin and a compatibilizing agent, said thermoplastic resin being selected from the group consisting of a polyester resin, a polycarbonate resin, a polyester carbonate resin, an acrylonitrile-butadiene-styrene resin, an acrylonitrile-styrene resin and a polyphenylene oxide resin, and said compatibilizing agent being a polyamide/aliphatic polyester block copolymer comprising (A) (I) a polyamide block composed substantially of at least one recurring unit selected from the group consisting of a recurring unit of the formula (1),

 (1)

wherein $R_1$ is an alkylene group having 4 to 12 carbon atoms, recurring unit of the formula (2)

 (2)

wherein $R_2$ is an alkylene group having 4 to 12 carbon atoms or an alkylene-arylene-alkylene group having 8 to 16 carbon atoms, and $R_3$ is an alkylene group having 4 to 12 carbon atoms or an arylene group having 6 to 12 carbon atoms, and mixtures of recurring units of formula (1) and formula (2);

and (II) an aliphatic polyester block composed substantially of at least one recurring unit selected from the group consisting of a recurring unit of the formula (3)

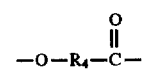 (3)

wherein $R_4$ is an alkylene group having 1 to 12 carbon atoms, a recurring unit of the formula (4)

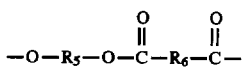

wherein $R_5$ is an alkylene group having 2 to 12 carbon atoms and $R_6$ is an alkylene group having 2 to 12 carbon atoms and mixtures of recurring units of formula (3) and formula (4);

said block copolymer having the following properties (B), (C) and (D):

(B) satisfying the following expression (5), $$T_1 - T < 100 - C \quad (5)$$

wherein T is the melting point (°C.) of the above block copolymer, $T_1$ is the melting point (°C.) of a polyamide composed of the polyamide block and C is the content (wt. %) of the polyamide block, (C) exhibiting the extraction amount which satisfies the expression (6), when extracted in tetrahydrofuran, $$E < (100 - C) \times 0.4 \quad (6)$$

wherein E is the extraction amount (wt. %) when the block copolymer is refluxed in tetrahydrofuran of which the weight is 100 times the weight of the block copolymer under heat for 2 hours, and C is the content (wt. %) of the polyamide block, and (D) having an intrinsic viscosity, measured at 35° C., in the range of from 0.5 to 5.

20. The intimate blend according to claim 19 wherein the block copolymer is the product obtained by melt-reacting (A) said polyamide composed substantially of the recurring units of formula (1) or recurring units of formula (2) or recurring units of a mixture of formula (1) and formula (2) and (B) said aliphatic polyester composed substantially of the recurring units of formula (3) or recurring units of formula (4) or recurring units of a mixture of formula (3) and formula (4), in the presence of an aromatic monohydroxy compound in an amount of 5 to 100 parts by weight per 100 parts by weight of the total amount of (A) and (B) and in the presence of an ester interchange catalyst, and distilling off the aromatic monohydroxy compound.

21. The intimate blend of claim 20 wherein the recurring units of the block copolymer are (I) nylon 6 or nylon 66 or mixture thereof and (II) polycaprolactone, polyethylene sebacate, polytetramethylene sebacate or polyneopentylene sebacate or mixture thereof.

22. The intimate blend of claim 20 wherein the recurring units of the block copolymer are (I) nylon 6 and (II) polycaprolactone.

23. The intimate blend of claim 22 wherein the thermoplastic resin is said polycarbonate resin.

24. The intimate blend of claim 23 wherein the polyamide resin is nylon 6.

25. The intimate blend of claim 19 wherein the thermoplastic resin is said polycarbonate.

* * * * *